United States Patent [19]

Shinno

[11] 4,425,177
[45] Jan. 10, 1984

[54] MEDICAL BAG AND METHOD OF MANUFACTURING THE SAME

[75] Inventor: Koji Shinno, Fujinomiya, Japan

[73] Assignee: Terumo Corporation, Tokyo, Japan

[21] Appl. No.: 425,889

[22] Filed: Sep. 28, 1982

[30] Foreign Application Priority Data

Mar. 26, 1982 [JP] Japan .................................. 57-48258

[51] Int. Cl.³ .......................... B29C 27/02; B65B 7/28
[52] U.S. Cl. .............................. 156/272.2; 156/273.7; 156/293; 156/379.6; 156/245; 264/248; 264/249; 264/259; 264/267
[58] Field of Search ............... 156/212, 213, 259, 294, 156/303.1, 245, 272.2, 273.5, 275.7, 262, 379.6, 380.9, 273.7, 293; 264/26, 259, 267, 248, 249

[56] References Cited

FOREIGN PATENT DOCUMENTS 52-50213 of 1977 Japan.
53-5337 of 1978 Japan.

Primary Examiner—Edward C. Kimlin
Assistant Examiner—Merrell Cashion
Attorney, Agent, or Firm—Frishauf, Holtz, Goodman & Woodward

[57] ABSTRACT

Medical bags composed of plastic sheets jointed at their edges and a fluid charging/discharging tube sealed between the edges of the sheets have suffered, due to the use of a mold having smooth and straight land conforming with the surface of the tube, various problems such as formation of burrs by the displaced molten plastic material on the inner side of the product bag, weakening or generation of pinholes around the free end of the tube attributable to excessive thinning of the sheets and so forth. According to the invention, these problems are overcome thanks to the use of a mold which has a central first land of an inside diameter slightly smaller than the sum of the tube diameter and thicknesses of sheets and at least one additional land provided at each side of the first land, the additional lands having inside diameters increasing successively and slightly greater than that of the first land. In the welding conducted by a high-frequency wave, the molten plastic material displaced from the region surrounded by the first land is forcibly displaced and confined in the regions surrounded by the additional lands so that the tube and the sheets are welded in a sealing manner without permitting formation of burrs while avoiding excessive thinning of the sheets around the free end of the tube.

2 Claims, 5 Drawing Figures

MEDICAL BAG AND METHOD OF MANUFACTURING THE SAME

BACKGROUND OF THE INVENTION

1. Field of the Invention

The present invention relates to a medical bag such as blood bag, transfusion bag or the like to which a tube for charging and discharging a liquid such as blood and transfusion solution into and out of the bag is connected through an outer peripheral seal provided on the tube, as well as to a method of producing the same.

2. Description of the Prior Art

A medical bag such as a blood bag or a transfusion bag is formed by superposing transparent or translucent plastic sheets and then jointing these sheets at their peripheral edges in a sealing manner, with a tube for passing a liquid such as blood or transfusion inserted into the bag through a portion of the jointed edge of the bag so as to provide a communication between the interior and exterior of the tube. In such a medical bag, it is necessary to provide a tight seal between the peripheral surface of the tube and the edges of the sheets contacting the tube. Conventionally, this seal has been achieved by pressing, with the tube placed between the edges of two sheets, the edges of two sheets by a heating mold which has a land of a smooth surface conforming with the shape of the straight tube, so that the edges of the sheets and the tube are pressed tightly to each other thereby to fuse and weld together the material of the sheets and tube to integrate them. According to this method, however, the materials constituting the tube and the sheets are forcibly displaced and flow beyond the predetermined region of seal between the tube and the sheet, to project as burrs into the space in the bag undesirably to making the bag unusable.

Another problem is that, since the tube usually has a larger thickness and, hence, a larger rigidity than the sheets which are generally thin and flexible, the portions of the sheets welded to the free end portion of the tube are thinned excessively thereby becoming weak or permitting the formation of pinholes when the sheets and the tube are welded to each other by the application of high pressure and heat by means of the heating mold having a land of a smooth straight surface.

SUMMARY OF THE INVENTION

Accordingly, an object of the invention is to provide a medical bag which can avoid, when the tube for liquid is integrated with the sealed edges of the sheets of the bag, the formation of burrs in the weld portion of the tube and sheets and generation of pinholes in the sheets around the free end portions of the tube, as well as a method for producing such a medical bag.

Another object of the invention is to provide a medical bag which permits the examination of all pieces of products in a simple and easy way, unlike the prior art in which the examination is made by sampling.

According to the present invention, a medical bag is formed by jointing two transparent or translucent sheets at their peripheral edges in a sealing manner and having a liquid charging/discharging tube welded between the jointed edges of the sheets so as to provide a fluid communication between the interior and exterior of the bag. The improvement resides in that the welded sealing portion between the tube and the sheets is composed of a high-frequency welded primary weld region located substantially at the center of the welded sealing portion, as viewed in the longitudinal direction of the welded sealing portion, and secondary weld regions located at both sides of the primary weld region, as viewed in the longitudinal direction of the welded sealing portion. The primary weld region which is formed through high-frequency welding permits parts of fused materials of the sheets and the tube to flow outwardly into the secondary weld regions, each of the secondary weld region being formed with the materials from the primary weld region to fill the gap between the tube and the sheets which are in a half-molten state, without substantially flowing beyond each marginal edge of the welded sealing portion.

In the medical bag stated above, at least one of the sheets is a translucent sheet embossed at its side contactable with the liquid to have a finely coarse surface, whereby the welded sealing portion which has been made transparent as a result of the high-frequency welding is discriminated from the non-welded portion which remains translucent, by the differences in the transparency and in the spreading of the transparent portion.

According to another aspect of the invention, there is provided a method of producing a medical bag formed by jointing two transparent of translucent sheets at their peripheral edges in a sealing manner and having a liquid charging/discharging tube welded between the jointed edges of the sheets so as to provide a fluid communication between the interior and exterior of the bag, comprising the steps of: placing the tube receiving a core for high-frequency welding at a predetermined portion between the inner sides of two sheets; preparing a heating mold having a central first land of an inside diameter slightly smaller than the sum of the diameter of the tube and the thickness of the sheet, and at least one second lands disposed at each side of the first land, the inside diameter of the second land being successively increased at each side of the first land, the smallest second land having an inside diameter slightly greater than that of the first land; pressing the edges of the sheets with the tube interposed therebetween by means of the heating mold and applying a high-frequency wave to the heating mold to melt the tube and the sheet, so that parts of molten materials of the tube and the sheets are forced by the first land to flow to both sides of the first land through the gap between the tube and the sheets so as to fill small spaces defined between the tube and the sheets in the area surrounded by each second land; whereby the sheets and the tube are welded at a welded sealing portion which includes a central primary weld region formed by the first land of the heating mold and secondary weld regions formed by the second lands at both sides of the primary weld region.

In the method stated above, the volume of the materials of the tube and the sheets forced out by the first land is preferably substantially equal to the total volume of the small spaces presented by the second lands.

DESCRIPTION OF THE PREFERRED EMBODIMENTS

The invention will be more fully understood from the following description of a medical bag and a method of producing the same in accordance with preferred embodiments of the invention when the same is read in conjunction with the accompanying drawings. Although the following description is made through specific reference to a blood bag by way of example, it will be understood by those who are skilled in the art that the invention can equally be applied to other types of medical bags such as a transfusion bag.

Figure 1:
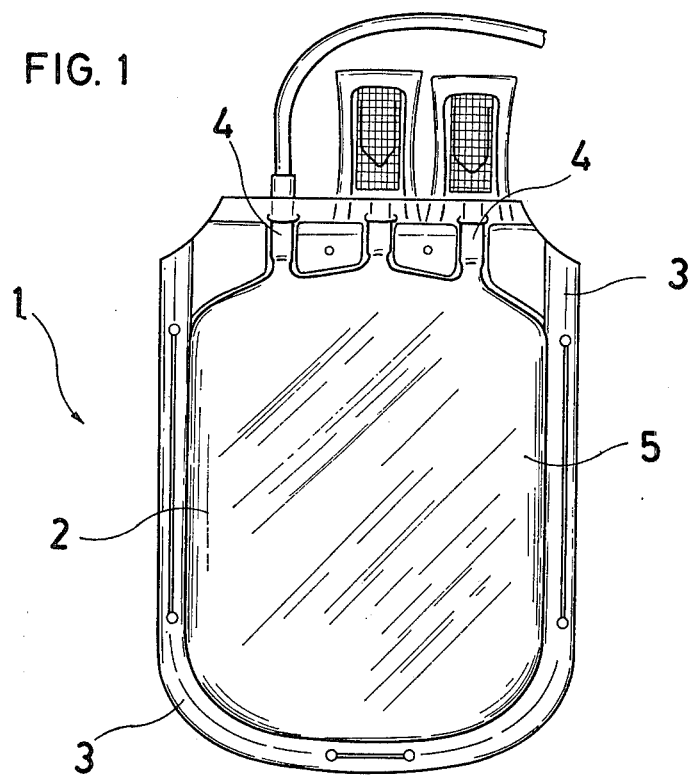
FIG. 1 is a plan view of a blood bag.
Figure 2:
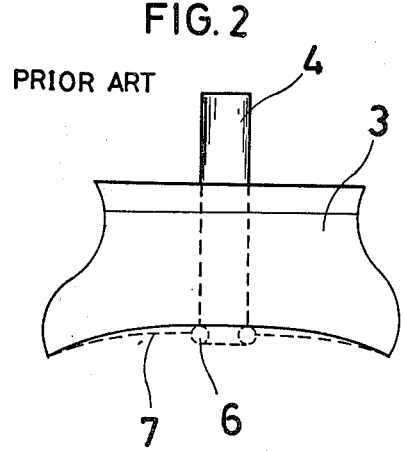
FIGS. 2 and 3 are illustrations explanatory of various problems encountered by conventional medical bags.
Figure 3:
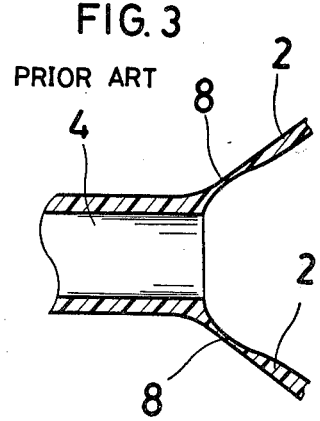

Referring first to FIG. 1, a known blood bag 1 is formed by a pair of transparent or translucent flexible sheets 2 which are welded in a sealing manner at their peripheral edges 3 to each other, with a blood charging-/discharging tube 4 placed and welded between the edges of the sheets at the top of the bag so as to provide a fluid communication between the interior 5 of the bag 1 and the exterior of the same. Conventionally, in welding the tube 4 between the welded edges of the sheets 2, the edges of the sheets with the tube placed therebetween are pressed by means of a heating mold having a smooth land presenting an inner peripheral surface conforming with the shape of the straight tube 2 so that the materials of the sheets and the tube are molten and welded, thereby to integrate the sheets and tube in a sealing manner. According to this method, however, there is no room for the pressed molten materials so that the molten materials is spread over the surface of the tube to undesirably project into the interior 5 of the product bag. This molten material, when solidified, disadvantageously forms burrs 6 in the form of droplets or linear burrs 7, as shown in FIG. 2. The use of the mold having the smooth land imposes another problem. Namely, since the tube 4 has a thickness and, hence, rigidity much greater than those of flexible sheets 2, the sheets are undesirably thinned or made weak in the region 8 around the free end portion of the tube 4 and, in the worst case, pinholes are undesirably formed in such region increasing the rate of rejection of the product bags, as explained before.

The present invention aims at eliminating the undesirable formation of burrs and pinholes, by receiving and confining the displaced molten materials of the tube and sheets which are, in the prior art, forced out to form burrs, due to the use of a specific heating mold having the following construction.

Figure 4:
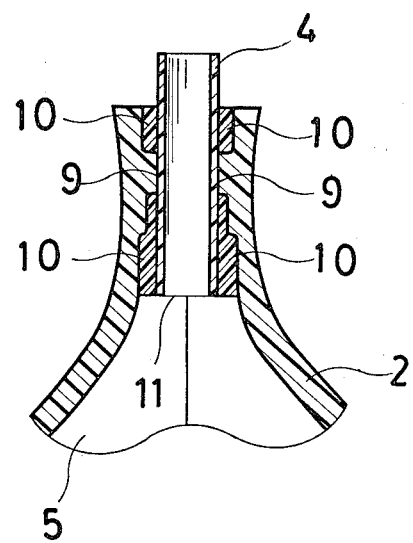
FIG. 4 is an enlarged exaggerated sectional view of the tube weld portion of a medical bag in accordance with the present invention.

FIG. 4 shows in an exaggerated manner the welded sealing portion between the sheets 2 and the tube 4 in a medical bag in accordance with the invention.

As will be understood from this FIG. 4, the welded sealing portion is composed of a central primary weld region 9 and secondary weld regions 10 formed at both sides of the primary weld region. The central primary weld region 9 is the region which is formed by melting the materials of the sheets and the tube and directly welding the molten materials by application of pressure and heat by means of a high-frequency heating mold, while permitting parts of the molten materials to be forced out and displaced through the gap between the sheets and the tube. The secondary weld regions 10 formed at both sides of the primary weld region 9 are the regions in which the sheets and the tube in the half-molten states are welded to each other by the parts of molten materials which have been displaced from the first weld region 9. The arrangement is such that the molten materials from the primary weld region 9 is not allowed to flow out beyond the predetermined extremities of the welded sealing portion, so that the undesirable formation of the burrs, as well as excessive thinning of the sheet edges around the free end of the tube, is advantageously avoided. The configuration of the spaces shown in FIG. 4 for receiving and confining the molten material coming from the first weld region is not exclusive. What is required is that the molten materials coming from the central first weld region are prevented from flowing beyond the free end 11 of the tube 4, i.e. beyond a predetermined extremity of welded sealing portion 3 of the bag 1.

Figure 5:
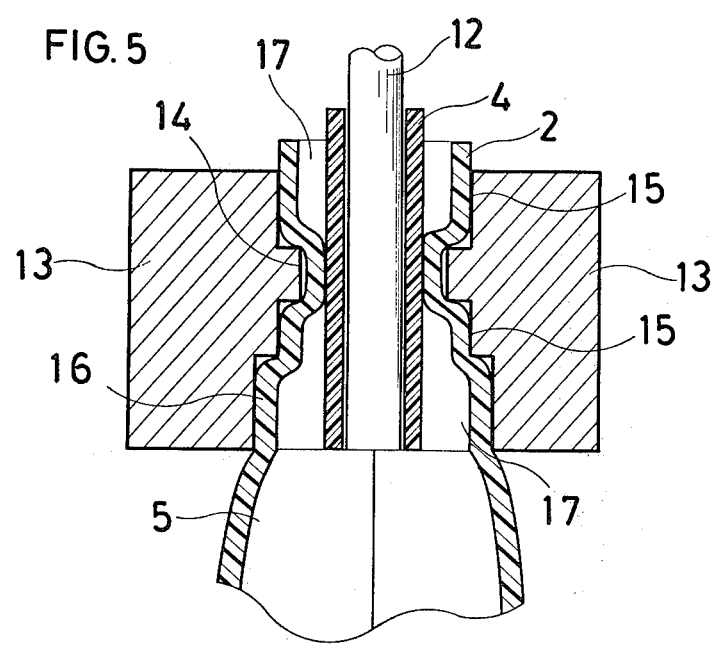
FIG. 5 is a longitudinal sectional view illustrating the process of producing a medical bag in accordance with the invention.

An explanation will be made hereinunder as to the method of producing the medical bag having the above-described construction, with specific reference to FIG. 5. In order to weld the tube 4 between the edges of the sheets 2 without forming any burr, the invention makes use of a high-frequency heating mold of a construction as shown in FIG. 5. Namely, a core mold 12 is received by the tube 4, while a split-type heating mold 13, consisting of two half parts is positioned such that a predetermined cavity is formed between the split-type mold 13 and the core mold 12. The two half parts of the split-type mold 13 present, when brought together, a first land 14 having an inside diameter slightly smaller than the sum of the diameter of the tube 4 and the thicknesses of the sheets 2, and at each side of the first land, a second land 15 having an inside diameter slightly greater than that of the first land and a third land having an inside diameter slightly greater than that of the second land. The number of lands such as second and third lands 15,16 at each side of the first land 14 may be increased or decreased as desired. For welding the tube 4 to the edges of the sheets 2, the edges of the sheets 2 and the tube 4 placed therebetween are pressed by the cooperation of the core mold 12 and the split-type mold 13 under application of a high-frequency wave. Since the distance between the first land 14 and the core mold 12 is smaller than the sum of thicknesses of the tube 4 and the sheets 2, the tube 4 and the sheets 2 are brought into close contact with each other and parts of materials of the tube 4 and the sheets 2 are molten by the heat produced as a result of friction. In consequence, parts of the molten materials are forcibly displaced from the region defined by the first land towards small spaces 17 defined by the second and third lands. In the regions defined by the second and third regions, the rate of heat generation is not so large because sheets and tube are not pressed to each other in these regions, so that the materials of the tube and sheets are not molten perfectly. However, these materials exhibit good adhesion to the molten materials displaced from the region of first land so that the displaced molten materials are well received by and confined within the spaces 17 surrounded by the second and third lands. In consequence, the small spaces 17 are substantially stuffed with the molten materials of the tube and sheets displaced from the region surrounded by the first land. The essential requisite for the construction of the split-type mold having the first, second and the third lands 14,15 and 16 is that the molten material displaced from the region surrounded by the first land 14 is substantially confined in the small spaces 17 provided between the tube 4 and the sheets 2 in the regions surrounded by the second and third lands 15,16. According to this arrangement, it is possible to perfectly eliminate the generation of burrs particularly at the interior of the bag 1 and to obtain a uniform quality of seal between the tube 4 and the sheets 2 in the welded sealing portion 3, as shown in FIG. 4 and, hence, attain attractive appearance of the bag.

Partly for preventing blocking of two sheets and partly for substituting for lubricant applied to the sheets before the formation of the bag, it is possible to use a transparent sheet which is embossed at the liquid contactable surface, i.e. the inner surface of the product bag, as at least one of the sheets constituting the bag. When such an embossed translucent sheet is used, the welded sealing portion if turned transparent while the other portion remains translucent after the welding, unlike the conventional bags in which not only the welded portion but also the burrs are turned transparent. Thus, according to the invention, there is a distinctive difference of transparency between the welded sealing portion 3 and the non-welded portion. It is possible to examine the quality of the product bags by optical examination or visual check of the extent of development of the transparent area between the welded portion and the non-welded portion. Namely, any bag in which the transparent portion undesirably unduly spread into the non-welded portion can easily be distinguished and rejected as being unacceptable goods. Thus, the invention affords an easy examination of all pieces of products, which is quite advantageous as compared with the prior art in which examination has been made by sampling from each lot of products.

The medical bag of the present invention can be made of vinyl chrolide resins with plasticity. The resins of the vinyl chloride group in this specification generally include copolymers of polyvinyl chloride resin, polyvinylidene chloride or polyvinyl chloride, a blend of polyvinyl chloride with another polymer such as styrene-acrylonitrile copolymer, styrene-methylmethacrylate copolymer or the like. Examples of monomers capable of forming the copolymer of polyvinyl chloride are vinyl ester, vinyl ether, vinylidene compound such as vinylidene chloride, lower olefin, aromatic compound such as vinyl acetate, vinyl bromide, vinyl fluoride, styrene and the like, cyclic saturated compound such as vinylpyridine, acrylate and its derivatives, and conjugate unsaturated compounds such as butadiene.

In order to prevent any elution of plasticizer, it is preferred to add to the above-mentioned resins of vinyl chloride system a silicone oil such as polymethyl phenylsiloxane, polydimethylsiloxane, polydiphenylsiloxane, polydimethyl-methylphenylsiloxane, polydimethyl-diphenylsiloxane, polymethyl hydrodienesiloxane or the like. (Refer to Japanese Patent Publication Nos. 50213/1977 and 5337/1978).

It is possible to use, as the sheet material for the medical bag in accordance with the invention, a laminated sheet consisting of an outer layer of a plastic material having a higher degree of polymerization and an inner layer of a plastic having a lower degree of polymerization. In such a case, the inner layer of lower melting point is molten as a result of the high-frequency welding so that only the outer layerr having a higher melting point is left to provide the thickness of the welded portion.

As will be understood from the foregoing description, the present invention offers various advantages as summarized hereinbelow.

(1) In conventional medical bags, the rate of rejection of products is high because of formation of burrs on the inner side of the bag particularly at the portion where the tube is attached. In contrast, according to the invention, the molten material which would form the burrs is conveniently confined within the welded sealing portion so that burrs are not formed, resulting in medical bags having a constant quality which can be produced stably.

(2) Since the weld region is uniformalized during welding of the tube and the sheets by high-frequency waves, the sparking between mold parts is diminished to suppress the formation of pinholes.

(3) Since the excessive thinning of the sheets around the free end of the tube in the bag is avoided, the weakening or generation of pinholes is prevented to ensure a higher reliability of the bag.

(4) When an embossed sheet is used as bag material, the region welded by high-frequency welding is made transparent. In addition, the bag of the invention is devoid of burrs which are inevitably formed in conventional bags to project out of the welded sealing portion. For these reasons, according to the invention, it is possible to examine the quality of the welded portion easily by making use of the difference in the transparency between the non-welded translucent region and the welded transparent region and, accordingly, to further enhance the safety and reliability in the use of the bag. Namely, any transparency developing to the non-welded portion suggests the generation of burrs so that unacceptable bags can easily be determined and rejected in accordance with the extent of development of the transparent portion.

What is claimed is:

1. A method of manufacturing a medical bag formed by jointing two transparent or translucent sheets at their peripheral edges in a sealing manner and having a liquid charging/discharging tube welded between the jointed edges of said sheets so as to provide a fluid communication between the interior and exterior of said bag, comprising the steps of: placing said tube at a predetermined portion between the inner sides of two sheets; inserting a core mold for high frequency welding within the said tube; preparing a heating mold having a central first land of an inside diameter slightly smaller than the sum of the outside diameter of said tube and the thicknesses of said sheets, and at least one second land disposed at each side of said first land, the inside diameter of each said second land being greater than the diameter of said first land, whereby only one of the said second lands has an inside diameter slightly greater than that of said first land; pressing said edges of said sheets with said tube interposed therebetween by means of said heating mold and applying a high-frequency wave to said heating mold to melt said tube and said sheets, so that parts of molten materials of said tube and said sheets are forced by said first land to flow to both sides of said first land through the gap between said tube and said sheets so as to fill small spaces defined between said tube and said sheets in the area surrounded by each second land; whereby said sheets and said tube are welded at a welded sealing portion which includes a central primary weld region formed by said first land of said heating mold and secondary weld regions formed by said second lands at both sides of said primary weld region.

2. A method of manufacturing a medical bag according to claim 1, wherein the volume of said materials of said tube and said sheets forced out by said first land is substantially equal to the total volume of said small spaces presented by said second lands.

* * * * *

UNITED STATES PATENT AND TRADEMARK OFFICE
CERTIFICATE OF CORRECTION

PATENT NO. : 4,425,177
DATED : January 10, 1984
INVENTOR(S) : Koji SHINNO

It is certified that error appears in the above-identified patent and that said Letters Patent is hereby corrected as shown below:

On the initial page of the patent, change the title to read:

--METHOD OF MANUFACTURING A MEDICAL BAG--;

COLUMN 5, line 22, after "transparent portion" insert --is--;

COLUMN 5, line 33, after "or polyvinyl chloride," insert

--as well as--.

Signed and Sealed this

Ninth Day of October 1984

[SEAL]

Attest:

GERALD J. MOSSINGHOFF

Attesting Officer

Commissioner of Patents and Trademarks